US005731069A

United States Patent [19]
Delle Donne et al.

[11] Patent Number: 5,731,069
[45] Date of Patent: Mar. 24, 1998

[54] COMPOSITE GAGE AND DRAIN HOLE SEALER

[75] Inventors: Ralph Delle Donne, Newark; Elizabeth Alexander Schowe, Hockessin, both of Del.; John Lynch Hanley, IV, Westland; Rohit Kumar Shah, Canton, both of Mich.

[73] Assignees: E. I. du Pont de Nemours and Company, Wilmington, Del.; Sika Corporation, South Field, Mich.

[21] Appl. No.: 537,315

[22] Filed: Sep. 29, 1995

Related U.S. Application Data

[63] Continuation of Ser. No. 181,155, Jan. 12, 1994, abandoned.

[51] Int. Cl.$^6$ .............. B32B 25/08; B32B 27/26; B32B 27/30; B32B 27/32
[52] U.S. Cl. .............. 428/215; 428/323; 428/343; 428/515; 428/516; 428/517; 428/519; 428/520; 156/94; 156/293; 156/303.1; 156/306.6; 156/307.1; 156/322; 525/193; 525/194; 525/195; 525/226; 525/227; 525/330.1; 525/330.2; 525/330.3; 525/370; 525/387
[58] Field of Search .............. 428/373, 63, 343, 428/346, 355, 515, 516, 518, 523, 517, 519; 156/94, 307.1, 307.3, 308.2, 309.6, 327, 322, 334, 306.6, 303.1; 526/318, 318.2, 318.3, 318.4, 318.45, 318.6; 525/329.5, 329.7, 330.2, 330.6, 310, 308, 304, 303

[56] References Cited

U.S. PATENT DOCUMENTS

| | | | |
|---|---|---|---|
| 3,168,961 | 2/1965 | Yates | 220/60 |
| 3,873,494 | 3/1975 | Lewis | 260/42.37 |
| 3,935,686 | 2/1976 | Dozols | 220/306 |
| 4,066,590 | 1/1978 | Eldred et al. | 260/28.5 A |
| 4,154,774 | 5/1979 | Hinterwaldner | 260/862 |
| 4,264,075 | 4/1981 | Miller et al. | 273/235 R |
| 4,316,971 | 2/1982 | Rim et al. | 525/310 |
| 4,391,384 | 7/1983 | Moore, III et al. | 220/359 |
| 4,473,683 | 9/1984 | Coran et al. | 525/78 |
| 4,483,537 | 11/1984 | Hanada et al. | 273/220 |
| 4,494,671 | 1/1985 | Morre, III et al. | 220/256 |
| 4,534,088 | 8/1985 | Ricke | 24/295 |
| 4,583,654 | 4/1986 | Pufpaff | 220/304 |
| 4,640,434 | 2/1987 | Johnson et al. | 220/287 |
| 4,646,932 | 3/1987 | Masler | 220/307 |
| 4,739,012 | 4/1988 | Hagman | 525/92 |
| 4,784,285 | 11/1988 | Patel | 220/307 |
| 4,815,629 | 3/1989 | Tausk | 220/352 |
| 4,823,978 | 4/1989 | Pufpaff | 220/307 |
| 4,824,726 | 4/1989 | Closson, Jr. | 428/349 |
| 4,832,234 | 5/1989 | Peterson | 220/306 |
| 4,857,571 | 8/1989 | Reiter et al. | 524/248 |
| 4,882,393 | 11/1989 | Herwig et al. | 525/330.2 |
| 4,953,742 | 9/1990 | Kraus | 220/367 |
| 5,206,294 | 4/1993 | Dawson | 525/196 |
| 5,266,133 | 11/1993 | Hanley et al. | 156/71 |

FOREIGN PATENT DOCUMENTS

| | | |
|---|---|---|
| 0 094 991 | 11/1983 | European Pat. Off. |
| 0 136 059 | 4/1985 | European Pat. Off. |
| 0 382 849 | 8/1990 | European Pat. Off. |
| 0 487 397 | 5/1992 | European Pat. Off. |
| 60-239238 | 11/1985 | Japan |

*Primary Examiner*—Paul J. Thibodeau
*Assistant Examiner*—Vivian Chen
*Attorney, Agent, or Firm*—Craig H. Evans

[57] ABSTRACT

A two-component, heat reactive patch particularly useful for sealing gage and drain holes in automobile bodies which comprises an ionomer component and an olefinic/elastomeric component. The ionomer component contains an ionomeric copolymer of ethylene and an $\alpha,\beta$-ethylenically-unsaturated $C_3$–$C_8$ carboxylic acid, a metallic coagent and a filler and, optionally, a non-ionomeric copolymer of ethylene. The olefinic/elastomeric component contains an uncrosslinked elastomer, a multifunctional acrylic monomer, and a free-radical curing agent.

18 Claims, No Drawings

COMPOSITE GAGE AND DRAIN HOLE SEALER

This is a continuation of application No. 08/181,155 filed Jan. 12, 1994, now abandoned.

FIELD OF THE INVENTION

This invention relates to composite materials useful for reliably sealing, patching or closing a hole in a workpiece, particularly to sealing, patching or closing gage and drain holes in an automobile body panel or the like.

BACKGROUND OF THE INVENTION

In many industrial coating or treating processes, workpieces are submerged or immersed in a treatment/coating bath or solution. Such techniques provide excellent control over treatment times and allow uniform surface treatment of ordinarily inaccessible areas of the workpiece. However, removing or draining the solution from the workpiece generally requires drilling, boring or forming of holes in the workpiece to allow prompt and controlled drainage.

For example, automobile vehicle bodies are frequently immersed in tanks to effect various treatments such as phosphate conversion coating which serves to inhibit surface oxidation and to provide a paint base. Drain holes are provided to permit treatment solutions to freely drain from workpieces that generally have configurations that would make drainage of the treatment solution extremely difficult.

Holes are also employed in workpieces to aid positive location and movement of the workpiece throughout the process in which it is assembled into a final product. Since the holes frequently perform both this "gage" purpose and the above noted "drain" purpose, they are commonly referred to as "gage and drain" holes. As the workpiece is moved throughout the process, the dimensions of the gage and drain holes may change due to distortion. This distortion can effect the performance of gage and drain hole sealers typically used.

After the holes have served their "gage and drain" function, they serve no useful purpose and, in fact, can create problems in later manufacturing or processing operations or steps. Such holes can also be detrimental to the appearance or integrity of the final product. Accordingly, it is desirable to seal or plug these gage and drain holes.

Many efforts have been made to provide a satisfactory seal. For the most part, a hard or rigid cap or plug, having essentially the same shape and size as the hole to be sealed, is mechanically engaged in the hole. The cap frequently is made of galvanized metal or hard polymer material. Various methods are used to hold the cap in place. Also, most automobile gage and drain hole covers are sealed by placing an expandable thermoplastic hot melt sealant-gasket around the edges of the cover. The sealant is softened, expanded and flowed by heat generally from the paint ovens. Temperatures of palm ovens range from about 110° C. to about 165° C. Exposure to these temperatures generally ranges from about 15 minutes to 30 minutes. The paint oven cycles may range from one to as many as three bakes for an automobile.

Examples of background art are as follows:

U.S. Pat. No. 4,832,234 to Peterson discloses a metal plug having aligning and engaging protuberances that have sufficient spring to snap the plug into place.

U.S. Pat. No. 4,784,285 to Patel discloses a self-sealing, non-metallic plug having the same shape as the opening to be filled. It has a hard hole-filling, locking portion united with a softer sealing portion. The hard portion is a polyolefin resin and the soft portion is a blend of thermoplastic crystalline polyolefin and monoolefin copolymer rubber.

U.S. Pat. No. 4,391,384 to Moore, III et al. discloses a closure for such holes which is a rigid plate with an attached gasket which undergoes a high degree of permanent volumetric expansion upon heating to fill gaps created, for example, by the means for attaching the plate to the panel. A typical means for attaching the plate to the panel is shown to be tabs on the plate that engage in slots at the ends of the hole in the panel.

U.S. Pat. No. 4,494,671 to Moore, III et al. discloses a closure for such a hole in a panel which includes a plate; a gasket; a means for securing the gasket to the plate; and means for securing the plate to the panel. The gasket has top, more rigid layer and a thin, bottom side "low melt" compound which contacts the plate and the panel and forms the seal when heated. The means for securing the plate to the panel is essentially the same as in U.S. Pat. No. 4,391,384. Ethylene vinyl acetate copolymers are taught as useful for the bottom layer and ethylene acrylate copolymers with linear low density polypropylene are taught as useful in the top layer.

U.S. Pat. No. 4,824,726 to Closson, Jr. discloses a multilayered patch and a method for applying it. Preferably a first or bottom layer is applied over the hole. It is a hot-melt adhesive layer of ethylene copolymer, phenolic hydrocarbon resins, phenolic resin esters, phenolic modified terpene resins or rosin esters that provides adhesion properties to allow the patch to be well bonded to metallic and organic substrates (such as the floor pan of an auto). Preferably the patch consists of a middle cold-shock resistant layer of olefinic copolymer such as cross-linkable ethylene copolymers preferably having acid functionality and a top stiff (strong) abrasion-resistant layer of a thermoplastic resin such as ionomeric, olefinic or styrenic material or a composite reinforced with mineral or glass fiber or other reinforcing fillers.

Depending on the size and shape of gage and drain holes, the nature of the surface defining the hole, and the cover employed, various problems are presented by existing systems that are not presented by the present invention. For example corrosion, which can be initiated in existing systems that employ metal caps, is resisted with the present system. Added weight due to the present sealing system is about 50% less than with metal cap systems. Vibration suppression is believed to be better due to the nature of the materials used. Excellent tear resistance and flexibility of the gage and drain hole sealer of the present invention reduce the risk of cap dislodgment upon sudden impact as in an accident and resultant secondary damage to other automobile components such as gasoline tanks and wire harnesses. The sealer of the present invention is a unitary structure that can be more easily stored and applied than other sealing systems.

SUMMARY OF THE INVENTION

The present invention relates to a composite patch which is useful for effectively and durably sealing and plugging holes in workpieces. It is particularly useful in patching gage and drain holes in automotive bodies as a result of its unique properties. While the invention will be described with particular reference to this automotive application and the metal substrate most often used in automotive bodies, it will be appreciated by one skilled in the art that the invention also applies to other applications and substrates.

The patch, preferably made from two components as described below, fully covers the gage and drain hole without the need for a rigid cap or plug. It exhibits a thermoplastic nature that allows thermal forming to irregular contours of the floor pan to seal the gage and drain holes. Upon heating to temperatures typically experienced in paint curing ovens (about 110° C. to 165° C.), the two components chemically react with each other resulting in a patch that thermo-seals to the floor pan forming a tough, resilient cover over the gage and drain hole. The patch can be prefabricated to configure to differently shaped holes and can be easily packaged (more parts to a box due to light weight and generally flat shape) and shipped to automotive plants where it will be used. It can be easily handled and applied in a single application and is designed to retain its positive location fully covering the hole once applied during the manufacturing process before the paint oven curing step even if such manufacturing process is comparatively stressful. In over-the-road operation of the automobile, the patch prevents the intrusion of air, water and noise into the interior of the automobile. Due to the nature of the patch, it is believed to provide acoustical dampening properties, with vibration energy being dissipated by the patch.

The composite patch of the present invention is preferably made from a two-component system.

One component ("ionomer-based component") is an ionomeric copolymer of ethylene and an α,β-ethylenically-unsaturated $C_3$–$C_8$ carboxylic acid melt blended with 0 to 25 parts by weight per 100 parts of the ionomeric copolymer of a compatible, thermoplastic non-ionomeric copolymer of ethylene and preferably a copolymer of ethylene and vinyl acetate or an α,β-ethylenically unsaturated $C_3$–$C_8$ carboxylic acid or mixture thereof; 1 to 10 parts by weight per 100 parts of the ionomeric copolymer of a metallic coagent and 0.2 to 15 parts by weight per 100 parts of the ionomeric copolymer of a reinforcing/thixotropic filler.

The second component ("olefinic/elastomeric-type component") is about 25 to 90 weight percent (wt. %) un-crosslinked olefinic polymer or elastomer; 1 to 10 wt. % multifunctional acrylic monomer; and 0.1 to 5 wt. % of a free-radical curing agent with the balance being one or a mixture of additives such as adhesive promoters, fillers, tackifiers, and stabilizers (all percentages based on total weight of second component).

Preferably the first component is about 30 to 90 mils (0.762 mm to 2.286 mm) thick and the second is 10 to 60 mils (0.254 mm to 1.524 mm) thick.

The two components are brought into intimate contact with each other (mated) at a high enough temperature to insure effective bonding of the components but low enough to avoid premature polymerization from occurring. Preferably, the components are mated at about 80° C. to about 95° C. and allowed to cool. With the intimate contact that is achieved, free radical polymerization is assured at the interface between the two components when the patch experiences the temperatures at which an original equipment manufacturing (OEM) oven operates (about 110° C. and above).

DETAILED DESCRIPTION OF THE INVENTION

The composite patch of the present invention comprises a two component system. The components and means for making the composite patch are described below:
Component Description The term "copolymer" will be used throughout to include polymers made from two or more monomers.

Ionomer-Based Component

The ionomer-based component is an ionomeric copolymer of ethylene and an α,β-ethylenically-unsaturated $C_3$–$C_8$ carboxylic acid wherein the acid moiety is at least partially neutralized with a metallic cation melt blended with 0 to 25 parts by weight per 100 parts of the ionomeric copolymer of a non-ionomeric thermoplastic, compatible polymer; 0.2 to 15 parts by weight per 100 parts of the ionomeric copolymer of a reinforcing/thixotropic filler; and 1 to 10 parts by weight per 100 parts of the ionomeric copolymer of a metallic coagent.

Preferably, the ionomer-based component contains a non-ionomeric thermoplastic, compatible copolymer. It has been found that a broader window of manufacturing operability exists when non-ionomeric thermoplastic compatible copolymer is present. Preferably, the non-ionomeric thermoplastic is present at 10 to 20 parts or 15 to 20 parts per 100 parts by weight of the ionomeric copolymer.

Preferably, filler is present at 0.5 to 10 parts or 0.5 to 5 parts per 100 parts by weight of the ionomeric copolymer.

Preferably, metallic coagent is present at 1 to 10 parts or 1 to 5 parts per 100 parts by weight of the ionomeric copolymer.

The copolymers of ethylene and α,β-ethylenically-unsaturated $C_3$–$C_8$ carboxylic acid ("ethylene-acid copolymers") used to make the ionomeric copolymer employed in the ionomer-based component preferably are $E/X_i/Y_i$ copolymers where E is ethylene; $X_i$ is a softening comonomer and $Y_i$ is acrylic or methacrylic acid (by softening, it is meant that the polymer is made less crystalline). Suitable softening monomers ($X_i$) are monomers selected from alkyl acrylate, and alkyl methacrylate, wherein the alkyl groups have from 1–12 carbon atoms which, when present, may be up to 50 (preferably up to 25, most preferably up to 2) wt. % of the polymer. The acrylic or methacrylic acid ($Y_i$) is present in an amount of 5 to 35 (preferably 10 to 35, more preferably 15–35) wt. % of the polymer.

The ionomers are made by processes well known in the art (see U.S. Pat. No. 3,262,272 to Rees, for example. The ionomeric polymer is made by at least partially neutralizing the acid moiety in the ethylene-acid copolymer 1–90% (preferably at least 40%, most preferably at least about 60%) by a cation such as lithium*, sodium*, potassium, magnesium*, calcium, barium, lead, tin, zinc* or aluminum (*=preferred), or a combination of such cations. Zinc is most preferred.

The non-ionomeric polymers employed in the ionomer-based component are thermoplastic copolymers that are compatible with the ionomeric copolymer; that is to say they form a visually homogenous mixture at processing temperatures. They include $E/X_{ii}/Y_{ii}$ copolymers where E is ethylene; $X_{ii}$ is one or more monomers selected from alkyl acrylate, alkyl methacrylate, vinyl acetate and alkyl monoesters of dicarboxylic acid wherein the alkyl groups have from 1–12 carbon atoms; and $Y_{ii}$ is one or more monomers selected from α,β-ethylenically-unsaturated $C_3$–$C_8$ carboxylic acids, particularly acrylic or methacrylic acid; wherein $X_{ii}$ must be present if $Y_{ii}$ is not and $Y_{ii}$ must be present if $X_{ii}$ is not. $X_{ii}$, when present, may be up to 60 (preferably up to 25, more preferably up to 2) wt. % of the $E/X_{ii}/Y_{ii}$ polymer. $Y_{ii}$, when present, may be up to 35 (preferably 5–35, more preferably 15–35) wt. % of the $E/X_{ii}/Y_{ii}$ polymer. E is present in an amount of at least 40 wt. % of the $E/X_{ii}/Y_{ii}$ polymer.

Specific ethylene-acid copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

Preferred ethylene-acid copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred ethylene-acid copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The above ethylene-acid copolymers, in addition to being useful for making the ionomeric copolymer, can be used as the non-ionomeric thermoplastic, compatible copolymer. The preferred non-ionomeric, thermoplastic, compatible copolymers, however, are ethylene vinyl acetate (EVA) copolymers. Most preferably, the EVA copolymer is a bipolymer.

The ionomer preferably has a melt index of about 0.2 to about 14, preferably about 0.2 to about 5.5, most preferably about 0.7 (ASTM D1238).

The melt index and vinyl acetate content of the preferred non-ionomeric, thermoplastic, compatible copolymer should be chosen to provide the desired combination of sag resistance and puncture resistance or pushout strength of the formed patch made therefrom. This melt index preferably is about 0.5 to about 25, about 0.5 to about 10, or most preferably about 1 (ASTM D1238). Vinyl acetate (VA) levels of about 5 to about 45 wt. %, about 12 to about 30 wt. %, or about 20 to about 30 wt. % are preferred.

Thixotropic fillers such as ground calcium carbonate, precipitated calcium carbonate, fumed silica, precipitated silica, talc, silicates, mica, clay and aromatic polyamide, such as KEVLAR® available from E. I. du Pont de Nemours and Company, and glass fiber may be added to improve physical and rheological properties. Pigments such as titanium dioxide, zinc oxide, and carbon black can be added for tinting purposes. Aromatic polyamide pulp is preferred. BEXLOY® W, a glass fiber filled ethylene/methacrylic acid (E/MAA) ionomer available from E. I. du Pont de Nemours and Company, is particularly preferred in that it provides the ionomer and filler together and yields excellent results.

The type and amount of filler to be employed are selected to decrease sag during processing and increase puncture resistance or pushout strength after cure. As discussed above, filler is present at about 0.2 to about 15 parts or about 0.5 to about 10 parts or about 0.5 to about 5 parts per 100 parts by weight of the ionomeric copolymer in the ionomeric component. The lower levels are particularly applicable when aromatic polyamides are used since desired sag and puncture properties can be achieved with lower loadings than are needed with other fillers. As a result of lower levels of addition, weight reduction of patch is possible with aromatic polyamide filler.

Typical plasticizers such as mineral oils, phthalates, benzoates and polybutenes can be added to modify rheology. Preferably, these are not used, but, if they are, those with low volatility are preferred.

The metallic coagents employed are those typically used in conjunction with peroxides to cure elastomers. Of particular utility in the present invention are the metal salts of acrylic and methacrylic acid. The metal preferably is chosen to be the same metal used to neutralize the ethylene-acid copolymer to make the ionomer. Zinc diacrylate and zinc dimethacrylate are most preferred.

Olefinic/Elastomeric-type Component

The olefinic/elastomeric-type component is about 25 to about 90 wt. % un-crosslinked olefinic polymer or elastomer, about 5 to about 20 wt. % phenolic resin, about 1 to about 10 wt. % multifunctional acrylic monomer, and about 0.1 to about 5 wt. % of a free-radical curing agent with the balance being one or a mixture of additives such as those described below as an additive package (based on total weight of olefinic/elastomeric-type component).

Preferably, the olefinic/elastomeric-type component is 30–75 wt. % or 25–60 wt. % of un-crosslinked olefinic polymer or elastomer; 5–10 wt. % phenolic resin; 1–5 wt. % multifunctional acrylic monomer; and 0.1–5 wt. % of a free-radical curing agent, and the balance being an additive package as described below.

Un-crosslinked elastomers useful in the olefinic/elastomeric-type component are butyl rubber, ethylene propylene (EP) copolymers such as ethylene/propylene/1,4-hexadiene (EPDM elastomers) terpolymer and tetrapolymer (tetrapolymers additionally contain norbornadiene or ethylidene norbornene), EP rubber, and styrene-butadiene rubber. Useful olefinic polymers are ethylene methacrylic acid copolymers and ethylene vinyl acetate (EVA). EVA, having a vinyl acetate (VA) content of 18 to 33 wt. % and a melt index of 10 to 800 (ASTM D1238), is preferred. Blends of more than one elastomer and olefinic polymer may be used.

Multifunctional acrylic monomers useful in the olefinic/elastomeric-type component are triethylene glycol dimethacrylate, ethylene glycol dimethacrylate, tetraethylene glycol dimethacrylate, 1,3-butylene glycol dimethacrylate, 1,3-butylene glycol diacrylate, neopentyl glycol dimethacrylate, triethylene glycol diacrylate dimethacrylate, ethoxylated bisphenol A dimethacrylate, methacrylate terminated monomer with average chain length of $C_{14}$–$C_{15}$ trimethylolpropane, trimethacrylate, tris (2-hydroxy ethyl) isocyanurate triacrylate, trifunctional methacrylate ester and trifunctional acrylate ester.

Free-radical curing agent useful in the olefinic/elastomeric-type component are sulfur curing or peroxide curing agents. Preferably, the free-radical curing agents are peroxides such as dicumyl peroxide, a-a' bis(t-butylperoxy)-m/p-diisopropylbenzene, 1,1-di(t-butylperoxy)-3,3,5-trimethylcyclohexane, di-t-butyldiperoxyphthalate, t-butyl peroxymaleic acid, t-butyl peroxybenzoate, t-butyl peroxyacetate, or ethyl 3,3-di(t-butylperoxy) butyrate.

An additive package including tackifying resins, fillers, pigments, plasticizers, adhesion promoters, water scavengers and the like may be incorporated into the olefinic/elastomeric-type component.

Tackifying resins such as novolac resins, hydrocarbon resins, phenolic resins and rosins may be incorporated into the olefinic/elastomeric-type component to improve adhesion of the patch to the substrate defining the hole to be covered. Particularly resins novolac resins which can be approximately represented by the general polymer formula:

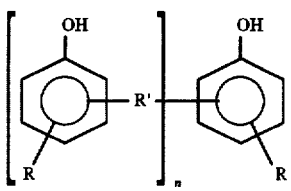

Wherein n can be an integer from 1 to 1000 and R can be hydrogen; a halogen (e.g. bromine, chlorine, fluorine, etc.); a $C_1$–$C_{16}$ alkyl group, a $C_6$–$C_{18}$ aryl group, or a $C_7$–$C_{20}$ arylalkyl radical, any of which may be substituted with a $C_1$–$C_{12}$ alkyl group or a halogen atom; or a hydroxy aryl or alkyl hydroxy aryl radical.

And, wherein R' can be $CH_2$ (often referred to a methylene bridge) or an organic group such as a rosin ester.

Examples of the novolac resins useful herein include, but are not limited to, phenol-formaldehyde, resorcinol-formaldehyde, p-butyl phenol-formaldehyde, p-ethyl phenol-formaldehyde, p-hexyl phenol-formaldehyde, p-propyl phenol-formaldehyde, p-pentyl phenol-formaldehyde, p-octyl phenol-formaldehyde, p-heptyl phenol-formaldehyde, p-nonlyl phenol-formaldehyde, bisphenol-A-formaldehyde, hydroxynaphthaleneformaldehyde and alkyl (such as t-butyl) phenol modified ester (such as pentaerythritol ester) of rosin (particularly partially maleated rosin).

Fillers, pigments and plasticizers such as described above for the ionomer-based component may be incorporated for the corresponding purposes as described above. Adhesion promoters such as organo-silanes may be incorporated in the olefinic/elastomeric-type component to improve adhesion. Water scavengers such as calcium oxide and molecular sieves may also be incorporated to eliminate or minimize water-associated problems such as blistering and loss of adhesion.

A particularly preferable blend of materials comprising the olefinic/elastomeric-type component would be 10 to 50 wt. % EVA with a VA content of 18 wt %, 10 to 50 wt. % EVA with a VA content of 28 wt %, 10 to 30 wt. % EPDM, 10 to 40 wt. % calcium carbonate filler, 5 to 20 wt. % phenolic resin, 1 to 10 wt. % acrylic monomer coagent, trace to 5 wt. % naphthenic oil, trace to 1 wt. % peroxide free radical initiator, trace to 2 wt. carbon black or trace to 1 wt. % titanium dioxide pigment, trace to 2 wt. % organosilane adhesion promoter, and trace to 2 wt. % calcium oxide desiccant, the total percentages of the foregoing adding to 100 wt. %.

Thickness

Preferably the ionomer-based component is about 30 to about 90 mils (0.762 mm to 2.286 mm), preferably about 45 to about 55 mils (1.143 mm to 1.397 mm) thick and the olefinic/elastomeric-type component is about 10 to about 60 mils (0.254 mm to 1.524 mm), preferably about 45 to about 55 mils (1.143 mm to 1.397 mm) thick. The total patch thickness is about 50 to about 100 mils (1.27 mm to 2.54 mm). Thickness of patch should be controlled to assist in managing shrinkage upon use.

Method of Preparation

Both components can be made by mixing their ingredients together at a temperature above the melting point of the polymers in the components using any intensive mixing device conventionally used in preparing thermoplastic blends. For example, rubber mills, internal mixers (such as BANBURY and BRABENDER mixers, single-or-multiple-blade internal mixers with a cavity heated externally or by friction, KOKNEADERS, multibarrel mixers such as FARRELL CONTINUOUS MIXERS, injection molding machines, and extruders (both single screw and twin screw, both co-rotating and counter-rotating, both intermeshing and non-intermeshing) may be used. These devices can be used alone or in combination with static mixers, mixing torpedoes, and/or various devices to increase internal pressure and/or intensity of mixing such as screws, valves, gates and the like designed for such purpose.

The finished composite patch can be made by an internal coextrusion process or an external coextrusion process. In both of these processes, the ionomeric component (Component "A") and the olefinic/elastomeric-type component (Component "B") are made by blending their respective ingredients using standard methods. For example, the ingredients of Component "A" can be blended together employing standard mixing equipment such as a high intensity (high shear) mixer (a BANBURY mixer, for example) or a twin-screw compounding extruder. The ingredients of Component "B" can be blended together employing standard mixing equipment such as a sigma blade mixer (a Baker-Perkins mixer, for example). High shear mixing can also be used. Components "A" and "B" can each be then pelletized, chopped or cut for future use if desired.

In the internal coextrusion process, Components "A" and "B" can be coextruded to form a heat curable patch. For this process, Component "A" can be extruded at a temperature of 175° to 200° C. through one die head of a coextruder typically used in the plastics industry, which will produce a material thickness of 1.0 millimeters (mm) to 2.0 mm. Component "B" can be extruded at a temperature of 85° to 1100° C. through a second die head which will produce a material thickness of 0.6 mm to 1.0 mm. The two components are contacted together, preferably immediately after leaving the die heads into a sheet having the desired width and thickness. By doing so, the temperature of Component "A" is sufficiently high to insure intimate, positive contact between the two components. The rate of extrusion should be such that essentially no tension exists (that is, so that the extruded sheet is relaxed or slumps) between the die head and the take-off so as to avoid buildup of stresses that will cause shrinkage of the product upon reheating, as in a paint oven. Shrinkage of less than 2% as measured using ASTM D1204-84 is preferred. The sheet is taken off the coextruder with a cooled roller stacker take-off system, the temperature of which being controlled between about 75° C. to about 95° C. to minimize premature free-radical curing at this point in the process of preparing the patch.

In the external coextrusion process, Components "A" and "B" are prepared in the same manner as above. Component "A" would then be extruded by means of, for example, a single screw plastic extruder at a temperature between about 175° C. and about 200° C. through a die head which will produce a final Component "A" sheet having a thickness of between 1.0 mm and 2.0 mm. As discussed above, the rate of extrusion should be set at a speed which will insure stresses that will cause shrinkage upon reheating (such as in an OEM paint oven) are minimized. Using a second extruder, Component "B" is extruded at a temperature between about 85° C. and 110° C. through a die head which will produce a sheet with a material thickness between about 0.5 mm and 1.0 mm. If the second extruder is portable, it can easily be relocated so that the sheet of Component "B" contacts Component "A" at a point where control of temperature is optimized. The sheet of Component "B" is fed, without cooling, in a manner so as to make intimate contact with the sheet of Component "A" just before the cooled roller stacker take-off system, the temperature of which being controlled between about 75° C. to about 95° C. to minimize premature free-radical curing at this point in the process of preparing the patch.

In either case, the resulting sheet of composite patch material can either be rolled onto a core for storage for future forming and/or die-cutting operations or it can be immediately formed and/or cut to desired size and shape for covering holes using standard thermoforming and profile extrusion line.

An alternative process for forming the patch involves blending each of the two components and extruding (component blends may be pressed into patches, but this will generally be practical for laboratory testing only due to the cost and effort required for such fabrication) them separately into a sheet as above. But, the sheets are then cooled to room temperature and stored on rolls or in individual sheets for future processing. To make the finished composite patch, the two component sheets are subsequently intimately contacted by means of a heated press or heated rollers set at a temperature between about 75° C. and about 95° C. for sufficient time at a sufficient pressure to insure effective bonding or interaction of the components and a finish composite sheet of about 50 to about 100 mils (1.27 mm to 2.54 mm) thick and the desired width that will have minimal shrinkage upon reheating (less than about 2%). The pressure applied should be about 10,000 to 45,000 pounds per square inch (psi) [$6.895 \times 10^7$ to $3.103 \times 10^8$ neutons per meter squared ($Nm^{-2}$)]. The time of contact under pressure and temperature should be about 15 to 30 seconds. The sheets should be cooled to minimize premature curing. The sheets can be formed and/or die cut in the same manner as described above.

To provide positive location of the patch when applied the automobile, a pressure sensitive adhesive known in the art, particularly one that adheres well to oily metal, can be applied to one side of the patch. Preferably, the patch is thermoformed to shape it to conform to the geometry of the aperture. The thermoformed patch can be inserted into the aperture so that it is mechanically held in place until it is cured in the OEM paint oven, for example.

EXAMPLE

Composite patches for sealing drain holes in a vehicle were prepared by the following process.

Ionomeric-type Component "A" was prepared by blending the ingredients listed in Table I in a BANBURY high intensity mixer at a temperature of 200° F. (93.33° C.) for 3 minutes.

In a first run, Component "A" was pressed in a laboratory press at about 400° F. (186.67° C.) and 45,000 psi ($3.103 \times 10^8$ $Nm^{-2}$) for ten minutes to make test plaques each having a weight of about 50 grams and a size of about 6 inches×6 inches×50 mils (152.4 mm×152.4 mm×1.27 mm). The test plaque was cooled with chilled water on the press prior to being removed from the press.

In a second run, Component "A" was pressed in the same manner as in the first run for 15 minutes instead of 10 minutes. Also, instead of cooling with chilled water prior to releasing pressure, was allowed to cool slowly without using chilled water and without pressure on the press.

TABLE I

| Ingredient | Parts per Hundred Parts (by weight) | | |
| --- | --- | --- | --- |
|  | I* | II* | III** |
| Ionomer | 100 | 100 | 100** |
| ELVAX ® 470 | 25 | — | 25 |

TABLE I-continued

| Ingredient | Parts per Hundred Parts (by weight) | | |
| --- | --- | --- | --- |
|  | I* | II* | III** |
| Zinc diacrylate | 3 | 3 | 3 |
| KEVLAR ® 6F543 | 0.5 | 0.5 | ** |

*Ionomer in I and II is SURLYN ® 9910, an E/MAA copolymer partially neutralized with zinc cations having a melt flow index (MI) of 0.7 grams/10 minutes (ASTM D-1238) available from DuPont.
**Ionomer in III is present as the ionomeric component of BEXLOY ® W, a 3.0 weight percent glass fiber filled E/MAA ionomer available from DuPont.
ELVAX ® 470 is an EVA copolymer having a VA content of 18% and a MI of 0.7 grams/10 minutes (ASTM D-1238) available from DuPont.
KEVLAR ® 6F543 is an aromatic polyamide pulp available from DuPont.

The olefinic/elastomeric-type Component "B" was TC-254 polyolefin-based, hot-melt sealer available commercially from Sika Corporation. The sealer is a blend of olefinic polymers in about equal parts by weight of ELVAX® 420 EVA copolymer (18 wt. % VA, 150 MI), ELVAX® 210 EVA copolymer (28 wt. % VA, 400 MI), NORDEL® 1440 EPDM terpolymer available from DuPont. It also contains pigment, filler, desiccant, naphthenic oil, adhesion promoter, peroxide curing agent, novolac resin, and trifunctional acrylic coagent as described above. Component "B" had a material thickness of about 1.0 mm.

The two component sheets were subsequently intimately contacted by means of a heated press set at a temperature of about 90° C. for 30 seconds at a pressure of 10,000 pounds-force (44,482 N) to insure effective bonding or interaction of the components and a finish composite sheet of about 2.0 mm to 2.5 mm thick and 150 mm wide. The composite sheet was cooled and then die cut to produce composite test patches having dimensions of 125 mm×125 mm×2.5 mm.

Test patches made by the process described in this example were conditioned at 21°±2° C. at a relative humidity of 50%±5% for 1 hour before being subjected to slump and penetration (pushout) tests at ambient conditions. Patches were applied to a about 127 mm by 127 mm OEM-specified electrocoated primed panel with a 65 mm diameter drain hole cut in the approximate center of the panel for both tests.

The panels with patch in place were placed on a rack in a direct-gas-fired oven, the rack being designed to allow the patch material to flow in an unrestricted manner through the drain hole during a bake cycle. The oven was heated to temperature indicated in Table II and held at that temperature for 30 minutes. After cooling, the amount of slump (the maximum sag-through as measured with calipers near the center of the hole) was determined to be as indicated in Table 3. Slump of 3.0 mm or less is preferred.

For the penetration (pushout) test, the cured panels with patch in place were then supported on a testing fixture that permits the patch material to flow in an unrestricted manner through the drain hole during the test. An Instron tensile tester, capable of pushing at up to 9000 newtons with a crosshead speed of 500 mm/minute, equipped with a probe (push-out rod) was used. The probe was one-half inch in diameter at the end that contacts the patch and had a flat head. The fixture with sample in place was placed in the tensile tester that had been calibrated and zeroed in accord with manufacturer's instructions, and the probe brought as close as possible to the center of the patch, without touching. The tensile tester was activated and run at a cross-head speed of 500 mm/minute until failure of the patch. Pushout test results (force at which integrity of patch was breached) are reported in Table II.

TABLE II

| Temp. | Tests | I | II | III |
|---|---|---|---|---|
| 116° C.* | Slump (mm) | 2.4 | 2.2 | 0.0 |
| | Pushout (lbf) | 256.1 | 211.4 | 273.2 |
| 163° C.* | Slump (mm) | 2.0 | 11.0 | 2.0 |
| | Pushout (lbf) | 261.1 | 332.1 | 191.5 |
| 163° C.** | Slump (mm) | 2.6 | 2.4 | 2.1 |
| | Pushout (lbf) | 338.6 | 241.8 | 182.2 |

*Patch made with Component "A" of first run
**Patch made with Component "A" of second run To convert pound-force (lbf) to neutons (N), values in Table II are multiplied by a factor of 4.44822.

We claim:

1. A composite preformed thermoplastic patch for sealing aperture in a workpiece comprising two components, an ionomer component and an olefinic/elastomeric component:
   a. the ionomer component comprising a melt blend of:
      i. an ionomeric copolymer of ethylene and an $\alpha,\beta$-ethylenically-unsaturated $C_3-C_8$ carboxylic acid partially neutralized with a metallic cation;
      ii. 0 to 25 parts by weight (based on 100 parts ionomeric copolymer) of a non-ionomeric copolymer of the form $E/X_{ii}/Y_{ii}$ where E is ethylene; $X_{ii}$ is one or more monomers selected from alkyl acrylate, alkyl methacrylate, vinyl acetate and alkyl monoesters of dicarboxylic acid wherein the alkyl groups have from 1–12 carbon atoms; and $Y_{ii}$ is one or more monomers selected from $\alpha,\beta$-ethylenically-unsaturated $C_3-C_8$ carboxylic acids; wherein $X_{ii}$ is 0 to 60 weight percent and $Y_{ii}$ is 0 to 35 weight percent of the $E/X_{ii}/Y_{ii}$ copolymer provided that $X_{ii}$ must be present if $Y_{ii}$ is not and $Y_{ii}$ must be present if $X_{ii}$ is not;
      iii. 1 to 10 parts by weight (based on 100 parts ionomeric copolymer) of a metallic coagent selected from the group consisting of metallic salts of acrylic acid and metallic salts of methacrylic acid; and
      iv. 0.2 to 15 parts by weight (based on 100 parts ionomeric copolymer) of filler; and
   b. the olefinic/elastomeric component comprising:
      i. 25 to 90 weight percent of an uncrosslinked elastomer, an olefinic polymer or a blend of an uncrosslinked elastomer and an olefinic polymer;
      ii. 1 to 10 weight percent multifunctional acrylic monomer; and
      iii. 0.1 to 5 weight percent of a free-radical curing agent;

wherein the ionomer-based component (a) and the olefinic/elastomeric component (b) are intimately contacted under conditions sufficient to bond the components as layers into a unitary multi-layer structure to insure intimate, positive contact between the layers so that the structure retains its unitary form during storage and is installable as an integral preformed patch in a single application over the aperture in the workpiece but are contacted under conditions that are insufficient to cause free radical polymerization at the interface between the layers.

2. The patch of claim 1 wherein
   a(i) is a metallic cation-neutralized ionomer of an $E/X_i/Y_i$ copolymer where E is ethylene; $X_i$ is a softening comonomer present in 0–50 wt % of the $E/X_i/Y_i$ copolymer and is selected from the group consisting of alkyl acrylate and alkyl methacrylate, wherein the alkyl groups have from 1 to 12 carbon atoms; and $Y_i$ is acrylic or methacrylic acid present in 5–35 wt. % of the $E/X_i/Y_i$ copolymer;

a(iii) is a metallic salt of acrylic or methacrylic acid; and
   a(iv) is selected from the group consisting of calcium carbonate, silica, silicates, talc, mica, clay, glass fiber and aromatic polyamide.

3. The patch of claim 2 wherein
   b(i) is selected from the group consisting of butyl rubber, EPDM elastomer, EP rubber, styrene-butadiene rubber, ethylene (meth)acrylic acid copolymers, ethylene vinyl acetate and a blend thereof,
   b(ii) is selected from the group consisting of triethylene glycol dimethacrylate, ethylene glycol dimethacrylate, tetraethylene glycol dimethacrylate, 1,3-butylene glycol dimethacrylate, 1,3-butylene glycol diacrylate, neopentyl glycol dimethacrylate, triethylene glycol diacrylate dimethacrylate, ethoxylated bisphenol A dimethacrylate, methacrylate terminated monomer with average chain length of $C_{14}-C_{15}$ trimethylolpropane, trimethacrylate, tris(2-hydroxy ethyl) isocyanurate triacrylate, trifunctional methacrylate ester and trifunctional acrylate ester; and
   b.(iii) is a peroxide.

4. The patch of claim 3 wherein the metallic cation in a(i) is selected from the group consisting of sodium, zinc, lithium, and magnesium and $X_i$ is present in an amount of up to 25 wt. % of the $E/X_i/Y_i$ copolymer and $Y_i$ is present in an amount of 10–35 wt. % of the $E/X_i/Y_i$ copolymer.

5. The patch of claim 4 wherein $Y_i$ is present in an amount of 15–35 wt. % of the $E/X_i/Y_i$ copolymer and $X_i$ is present in an amount up to 2 wt. % of the $E/X_i/Y_i$ copolymer.

6. The patch of claim 5 wherein the ionomer of the $E/X_i/Y_i$ copolymer is a zinc neutralized ethylene/ methacrylic or ethylene/acrylic acid copolymer.

7. The patch of claim 6 wherein a(iii) is a zinc salt of acrylic or methacrylic acid.

8. The patch of claim 7 wherein a(iii) is zinc diacrylate and zinc dimethacrylate.

9. The patch of claim 5 wherein a(iii) is a metallic cation salt of acrylic or methacrylic acid wherein the metallic cation is the same as the metallic cation used to neutralize a(i).

10. The patch of claim 3 wherein a(ii) is a copolymer of ethylene and vinyl acetate.

11. The patch of claim 10 wherein b(i) is ethylene vinyl acetate copolymer having a vinyl acetate content of 18 to 33% and a melt index 10 to 800 (ASTM D1238) or a blend containing said ethylene vinyl acetate copolymer.

12. The patch of claim 3 wherein b(iii) is selected from the group consisting of dicumyl peroxide, a-a' bis(t-butylperoxy)-m/p-diisopropylbenzene, 1,1-di(t-butylperoxy)-3,3,5-trimethylcyclohexane, di-t-butyldiperoxyphthalate, t-butyl peroxymaleic acid, t-butyl peroxybenzoate, t-butyl peroxyacetate, and ethyl 3,3-di(t-butylperoxy) butyrate.

13. The patch of claim 1 or 3 wherein, in the ionomer component,
   a(ii) is present in an amount of 10 to 20 parts by weight,
   a(iii) in an amount of 1 to 5 parts by weight, and
   a(iv) is present in an amount of 0.5 to 10 parts by weight (all parts based on 100 parts ionomeric copolymer); and wherein, in the olefinic/elastomeric component,
   b(i) is present in an amount of 30 to 75 weight percent,
   b(ii) is present in an amount of 1 to 5 weight percent, and b(iii) is present in an amount of 0.1 to 5 weight percent, with the balance of the 100 weight percent of the olefinic/elastomeric component being one or a mixture of additives selected from the group consisting of adhesive promoters, fillers, tackifiers, and stabilizers.

14. The patch of claim 1 or 3 wherein, in the ionomer component, a(ii) is present in an amount of 15 to 20 parts by weight, a(iii) is present in an amount of 1 to 5 parts by weight, and a(iv) is present in an amount of 0.5 to 5 parts by weight, all parts based on 100 parts ionomeric copolymer; and wherein, in the olefinic/elastomeric component, b(i) is present in an amount of 25 to 60 weight percent, b(ii) is present in an amount of 1 to 5 weight percent, and b(iii) is present in an amount of 0.1 to 5 weight percent, with the balance of the 100 weight percent of the olefinic/elastomeric component being one or a mixture of additives selected from the group consisting of adhesive promoters, fillers, tackifiers, and stabilizers.

15. The patch of claim 1 wherein the ionomer component has a thickness of about 0.762 mm to about 2.286 mm and the olefinic/elastomer component has a thickness of about 0.254 mm to about 1.524 mm.

16. The patch of claim 1 further comprising a pressure sensitive adhesive applied to one side of the patch.

17. A method of sealing an aperture comprising placing the patch of claim 1 over aperture and curing at a temperature of about 110° C. to about 165° C.

18. A method of sealing an aperture comprising first thermoforming the patch of claim 1 to conform to the geometry of the aperture, then inserting the patch into the aperture and then heating to a temperature of 110° C. to 165° C.

* * * * *